(12) United States Patent
Schneider (10) Patent No.: US 7,825,351 B2
(45) Date of Patent: Nov. 2, 2010

(54) ELECTRODE HOLDER

(75) Inventor: Darryl Douglas Schneider, Townsville (AU)

(73) Assignee: Dazcor IP Pty Ltd, Queensland (AU)

( * ) Notice: Subject to any disclaimer, the term of this patent is extended or adjusted under 35 U.S.C. 154(b) by 484 days.

(21) Appl. No.: 11/979,479

(22) Filed: Nov. 5, 2007

(65) Prior Publication Data

US 2008/0128398 A1 Jun. 5, 2008

Related U.S. Application Data (63) Continuation-in-part of application No. 10/544,703, filed on Aug. 5, 2005, now abandoned.

(30) Foreign Application Priority Data

Sep. 21, 2007 (AU) .............................. 2007905188

(51) Int. Cl.
*B23K 9/28* (2006.01)

(52) U.S. Cl. ..................................... 219/138; 219/141
(58) Field of Classification Search ................. 219/138, 219/140, 141
See application file for complete search history.

(56) References Cited

U.S. PATENT DOCUMENTS

| 2,310,020 A | * | 2/1943 | Gallo | ......................... 219/141 |
| 2006/0086709 A1 | * | 4/2006 | Schneider | .................... 219/138 |

\* cited by examiner

*Primary Examiner*—Kevin P Kerns
(74) *Attorney, Agent, or Firm*—Stein McEwen, LLP (57) ABSTRACT

A hand held electrode holder has a power on/off switch on the handle of the electrode holder and a trigger to open the clamping jaws that clamp the electrode. The holder has internal parts which operate such that the trigger cannot open the clamping jaws while the switch is in the power on position thereby reducing the possibility of an electric hazard when changing electrodes.

7 Claims, 11 Drawing Sheets

ELECTRODE HOLDER

CROSS REFERENCE TO RELATED APPLICATION(S)

The present application is a continuation-in-part of application Ser. No. 10/544,703, filed Aug. 5, 2005 abandoned.

BACKGROUND OF THE INVENTION

This invention is directed to an electrode holder of the type used for welding, air arc gouging, thermal lancing etc, and which contains an isolating switch and an electrode locking arrangement which is associated with the isolating switch such that operation of the isolating switch permits removal of the electrode from the electrode holder.

In the field of welding there is provided an apparatus which contains an electrode and where the electrode is held in a holder, the holder typically being handheld by an operator. The electrode is a consumable and must be replaced periodically and there is always a hazard in doing so as it is essential that the electrode is isolated from the power prior to removal. In some situations, the electrode must be isolated from the power source when not in use. The holder is relatively lightweight to allow it to be used for long periods of time without fatigue.

The electrode must be in electrical contact with the power supply. Typically, the electrode is clamped between jaws on the holder which hold the electrode in place. These jaws can be opened, typically by depressing a lever, button and the like to release the electrode. Alternatively, a twist collar is provided to release the electrode. A hazardous situation can occur if an operator releases the electrode without initially switching off the power, or touches the electrode accidentally.

These electrodes and the electrode holder is used in a variety of applications. One application is manual metal arc welding which uses a consumable electrode which is held in a handheld holder. The electrode is placed close to the metal to be welded and an arc is formed to melt the metal and to form the weld. The electrode typically comprises a central metal wire and a surrounding material which decomposes to form an inert gas shield around the molten pool of metal. The electrodes are consumed and need to be regularly replaced.

Another type of welding technique is tungsten inert gas welding. In this technique, an electrode is held within a holder, and a shielding gas (typically argon), flows about the electrode and onto the work surface which is to be welded. A filler wire is used to provide the molten weld metal. The electrode is typically a tungsten electrode.

Another type of technique is a thermal cutting technique where a super hot gas or arc is used to cut a metal. These techniques include air arc gouging, and thermal lancing. Each of these techniques still requires the use of a electrode in a holder.

However, my earlier designs still suffered from some disadvantages including complexity of componentry, and sometimes a somewhat awkward arrangement of the power isolating switch.

I have now designed improvements to the electrode holder which uses a similar concept as described in my earlier patent, but has a design, construction and mechanism which may be better and even safer to use.

It will be clearly understood that, if a prior art publication is referred to herein, this reference does not constitute an admission that the publication forms part of the common general knowledge in the art in Australia or in any other country.

BRIEF SUMMARY OF THE INVENTION

It is an object of the invention to provide an electrode holder which may overcome at least some of the above-mentioned disadvantages or provide a useful or commercial choice.

In one form the invention resides in an electrode holder comprising the following components:

1. an outer housing having a head portion and a handle portion,
2. an electrode clamping assembly in the head portion and which comprises a moving jaw and a fixed jaw, the moving jaw being movable between an electrode clamping position and a release position,
3. a rigid conducting element having a lower power cable attachment portion attachable directly or indirectly to power cable, an upper portion electrically engageable with the moving jaw, and a track portion, the rigid conducting element able to move between a power on position where the upper portion electrically engages with the moving jaw to provide power to the electrode and a power off position where the upper portion is in an electrically isolating position relative to the moving jaw,
4. the moving jaw being locked into the electrode clamping position such that the moving jaw is unable to move to the release position while the rigid conducting element is electrically engaged with the moving jaw,
5. an operating member having a portion extending from the housing and able to be operated by a person, the operating member having a travelling portion that travels along the track portion on the rigid conducting element, the travelling portion adapted to travel along the track portion from a first position where the travelling portion pushes the rigid conducting element into the electrically engaged position thereby providing power to the electrode, and to a second position where the rigid conducting element moves to the electrically isolating position relative to the moving jaw,
6. a biasing member to bias the rigid conducting element into the electrically isolating position such that when the travelling portion moves to the second position, the biasing member biases the rigid conducting element into the electrically isolating position, and,
7. a jaw release member which is operable from outside the housing to enable the jaws to be released such that the electrode can be removed or inserted between the jaws.

Figure 1:
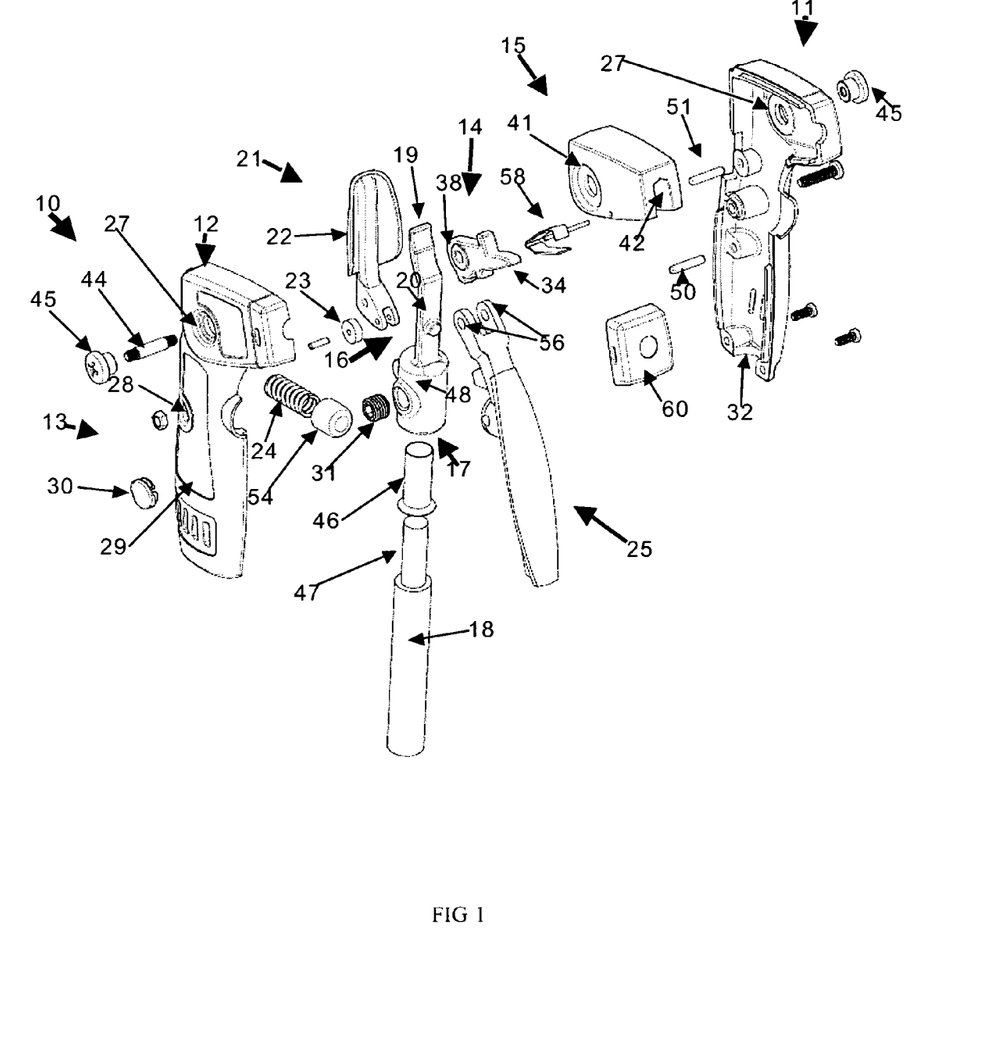
FIG. 1 illustrates an exploded view of the various components of the electrode holder.

In a particular embodiment and as illustrated in FIG. 1, the above features can exemplified with the following reference numerals:

1. an outer housing 10, 11 having a head portion 12 and a handle portion 13,
2. an electrode clamping assembly in the head portion and which comprises a moving jaw 14 and a fixed jaw 15, the moving jaw being movable between an electrode clamping position and a release position,
3. a rigid conducting element 16 having a lower power cable attachment portion 17 attachable directly or indirectly to power cable 18, an upper portion 19 electrically engageable with the moving jaw, and a track portion 20, the rigid conducting element able to move between a power on position where the upper portion electrically engages with the moving jaw to provide power to the electrode and a power off position where the upper portion is in an electrically isolating position relative to the moving jaw,
4. the moving jaw being locked into the electrode clamping position such that the moving jaw is unable to move to the release position while the rigid conducting element is electrically engaged with the moving jaw, 5. an operating member [e.g. switch] 21 having a portion 22 extending from the housing and able to be operated by a person, the operating member having a travelling portion 23 that travels along the track portion 20 on the rigid conducting element, the travelling portion adapted to travel along the track portion from a first position where the travelling portion pushes the rigid conducting element into the electrically engaged position thereby providing power to the electrode, and to a second position where the rigid conducting element can move to the electrically isolating position relative to the moving jaw, 6. a biasing member [e.g. spring] 24 to bias the rigid conducting element into the electrically isolating position such that when the travelling portion moves to the second position, the biasing member biases the rigid conducting element into the electrically isolating position, and 7. a jaw release member [e.g. trigger] 25 which is operable from outside the housing to enable the jaws to be released such that the electrode can be removed or inserted between the jaws.

It should be appreciated that the reference numerals illustrate a preferred embodiment of the invention only and it is not considered that the invention is to be limited only to the preferred embodiment.

The electrode holder can be used with a manual metal arc welding apparatus which uses a consumable electrode. Alternatively, the electrode holder can be used with tungsten inert gas welding. Alternatively, the electrode holder can be used in a thermal cutting technique.

The outer housing will typically be formed in a number of parts which can be attached together. It is envisaged that the outer housing will be formed from two halves comprising a left-hand half and a right-hand half. The housing may be formed from any suitable material and it is envisaged that a suitable material will comprise a plastic, a filled plastic, a plastic composite material, a non plastic material and the like.

The size of the housing may vary but it is envisaged that the electrode holder will be handheld and therefore the size of the housing should be suitable for handheld use. It is therefore envisaged that the electrode holder will have a handle portion that can be comfortably gripped by a person's hand and a head portion to which an electrode can be attached. The handle portion may have a length of between 10-40 cm. The head portion may have a length of between 5-20 cm.

An electrode clamping assembly forms part of the holder and will typically be positioned at least partially inside the head portion. The clamping assembly comprises a pair of clamping members which may comprise jaws and the electrode clamping assembly will typically comprise a moving jaw and a fixed jaw. However, there may be some circumstances where the clamping assembly comprises a pair of relatively moving jaws. The clamping members are typically both electrically conducting and may be formed from brass or other conductive metal, metals, alloys, and the like.

Figure 8:
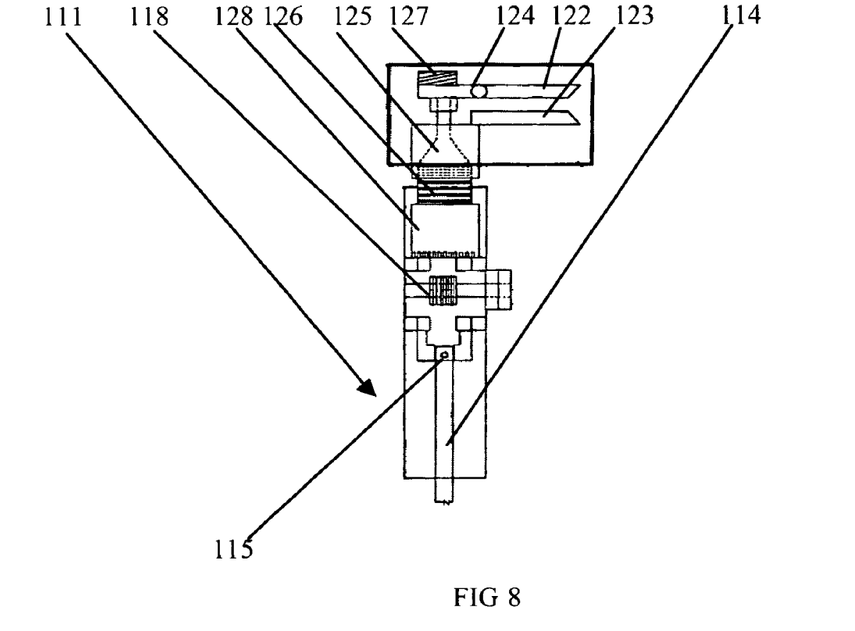
FIG. 8 illustrates a side view of the electrode holder of FIG. 7 in the power isolating position.
Figure 9:
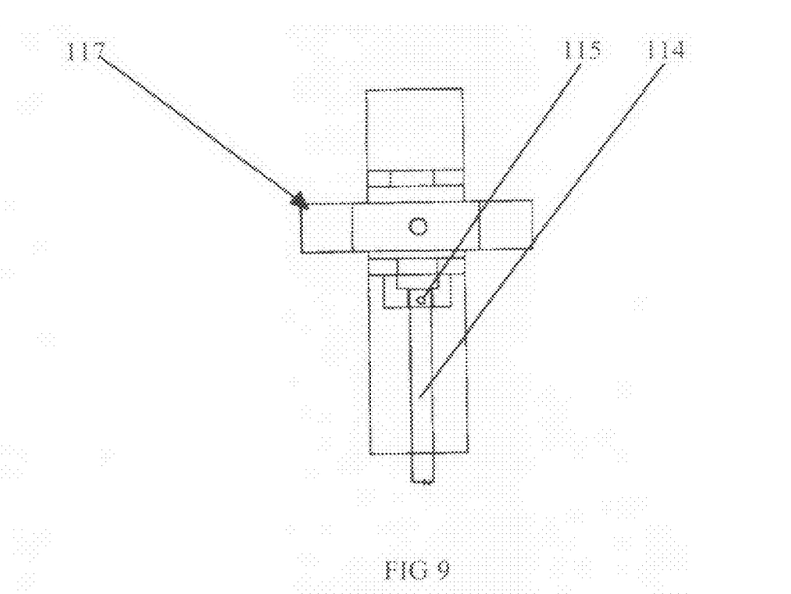
FIG. 9 illustrates a side view of the power isolating switch.

The moving jaw may comprise a forward nose portion having an upper land portion which clamps against the electrode to hold the electrode in place. The moving jaw may comprise a rear curved portion an example of which is illustrated in FIG. 8 and against which the upper portion (e.g. 19) of the rigid conducting element can engage to provide a flow of power to the moving jaw. The moving jaw may further comprise a stop portion against which the rear portion of the electrode can abut to prevent over insertion of the electrode into the clamping assembly. The moving jaw may further contain an opening extending through the moving jaw. A pin may extend through the opening to enable the moving jaw to pivot between the closed position and the open position. The pin may also function to hold the clamping assembly within the head portion. The moving jaw may further comprise a pair of spaced apart projections that function as limiters. The jaw release member (e.g. trigger) may have its travel limited by these limiters and this will be described in greater detail below.

The fixed jaw (e.g. 15) is suitably made of brass or other electrically conductive material. The fixed jaw may be substantially hollow such that the moving jaw (e.g. 14) can be positioned substantially within the fixed jaw. The fixed jaw may contain an opening through which a pin may pass to hold the fixed jaw in position in the housing. The fixed jaw may have a front portion formed with a substantially U-shaped channel the upper end of the channel comprising a land portion to clamp the electrode, with the nose portion of the moving jaw being positioned within the U-shaped channel to provide the other land portion to clamp the electrode.

The rear of the fixed jaw may be open.

The rigid conducting element (e.g. 16) has a lower portion (e.g. 17) to which a power cable can be attached either directly or indirectly. The rigid conducting element may be formed from brass or other electrically conductive material. The lower portion may comprise a body which is substantially hollow and which has an open bottom into which a power cable can pass. If desired, a small cap member can be fitted over the exposed wires of the power cable to ensure that stray wires do not pass on the outside of the body. A small locking member (typically a grub screw) can be used to lock the power cable in position relative to the lower portion.

The upper portion of the rigid conducting element is adapted for contact with the moving jaw. The upper portion may comprise some form of finger which can be urged against and away from the moving jaw to provide power or to cut off power from the moving jaw. Below the upper portion is provided a track portion (e.g. 20). The track portion may comprise a relatively flat part of the rigid conducting element against which the travelling portion (e.g. 23) of the operating member (e.g. switch 21) can travel. However, the track portion may have other configurations. For instance, the track portion may comprise a rail or something similar and the travelling portion may comprise a grooved wheel which engages with the rail. Alternatively, the track portion may comprise a groove or channel in which the travelling portion can pass. The length of the track portion may vary but it is envisaged that a suitable length will be between 3-10 cm. The lower end of the track portion may connect to the power cable attachment portion.

The rigid conducting element (and particularly the upper portion) can move between a first position where the rigid conducting element engages with the moving jaw and a second position where the rigid conducting element does not engage with the moving jaw. Suitably, the rigid conducting element can pivot between these two positions. Therefore, the rigid conducting element may be attached to a pivot pin. The pivot pin may extend through an opening on a small lug that extends from the lower power cable attachment portion an example of which is illustrated least in FIG. 2. By having the pivot pin positioned adjacent the cable attachment portion the degree of pivoting movement at the cable attachment portion is minimal (typically only a few millimetres) and therefore does not cause unnecessary wear and tear between the power cable attachment to the cable attachment portion.

The moving jaw is locked in the electrode clamping position when the rigid conducting element is electrically engaged with the moving jaw. Thus, it will not be possible to remove the electrode when the power is on. While there are various mechanisms that can allow this to happen, a particularly preferred mechanism will be described below and which uses the jaw release member (e.g. trigger 25) together with the rigid conducting element as part of the locking mechanism.

An operating member (e.g. a switch 21) is provided to move the rigid conducting element into the "on" position where it is in electrical engagement with the moving jaw and which also allows the rigid conducting element to move to the "off" position where it is not in electrical engagement with the moving jaw. The operating member has a portion which extends from the housing and which can be operated by the person using the electrode holder. This portion may comprise a handle in the form of a lever, a slide, a knob and the like that can be manipulated by the person using the electrode holder. The portion is preferably positioned at a rear portion of the housing and in an upper part of the housing such that when the handle is gripped, the portion does not form part of the gripping area and can therefore be operated with one hand while the handle is being gripped by the other hand. In a preferred embodiment, the operating member has an internal part (which is inside the housing) and the internal part has a travelling portion (e.g. wheel 23) that engages with the track portion on the rigid conducting element and can travel along the track portion.

The travelling portion may comprise at least one small wheel/roller and the like which can travel along the track portion. Alternatively, the travelling portion may comprise a member that can slide or otherwise move along or against the track portion. In the preferred embodiment, the travelling portion comprises a small wheel.

Operation of the operating member (e.g. manipulation of the switch), can cause the travelling portion to travel along the track portion and in doing so can cause the rigid conducting element to be pushed against the moving jaw (e.g. the on position). Operation of the operating member in the other direction can cause the travelling portion to move in the opposite direction along the track portion and can allow the rigid conducting element to be pushed away from the moving jaw (e.g. the off position).

In one form, the rigid conducting element can be operatively engaged with the operating member such that movement of the operating member causes the rigid conducting element to move between the on and off position. In another form, (and the preferred form of the invention), a biasing member (e.g. a spring) can be provided to push or bias the rigid conducting element into the "off" position.

The biasing member may comprise a spring, a rubber compressible member, or something similar. The spring will typically be biased against the rigid conducting element to naturally bias the rigid conducting element into the "off" position. The spring may also be biased against the jaw release member (e.g. trigger) and this will be described in greater detail below.

The jaw release member may comprise a trigger that can be squeezed by a person's hand to release the electrode. The jaw release member may be operatively attached to the moving jaw to move this jaw between the open and closed position. The jaw release member may comprise a head portion which is attached to the moving jaw and the head portion may be bifurcated to extend to each side of the moving jaw. The head portion may be provided with an opening to accommodate a pin and it is preferred that the opening in the head portion aligns with the opening in the moving jaw such that the same pin can connect the head portion (and therefore the jaw release member) and the moving jaw in the housing.

The limiters on the moving jaw suitably abut against the head portion area of the jaw release member to cause operation of the moving jaw when the head portion area contacts the limiters. This will be described in greater detail below.

The jaw release member may also comprise a portion or projection which, when the rigid conducting element (e.g. 16) is in the engaging "on" position, the portion/projection on the jaw release member can contact the rigid conducting element upon attempted squeezing of the jaw release member thereby preventing the jaw release member from opening the moving jaw which essentially locks the moving jaw in the locked position.

The jaw release member may also comprise another portion to accommodate the biasing member such that the biasing member extends between the jaw release member and the rigid conducting element.

If desired, gas flow passageways can be provided in the housing to enable gas to flow to the electrode area.

In a broad form the invention comprises a hand held electrode holder having a power on/off switch on the handle of the electrode holder and a actuator (e.g. a trigger) to open the clamping jaws that clamp the electrode. The holder has internal parts which operate such that the actuator cannot open the clamping jaws while the switch is in the power on position thereby reducing the possibility of an electric hazard when changing electrodes.

BRIEF DESCRIPTION OF THE DRAWINGS

Different embodiments of the invention will be described with reference to the following drawings in which.

Preferred Embodiment of the Invention

Alternative Embodiments of the Invention

DETAILED DESCRIPTION

Preferred Embodiment of the Invention

FIGS. 1-6

Referring to the drawings and initially to FIG. 1, there is illustrated an exploded view of the electrode holder which generally comprises the following components:

1. an outer housing 10, 11 having a head portion 12 and a handle portion 13,
2. an electrode clamping assembly in the head portion and which comprises a moving jaw 14 and a fixed jaw 15, the moving jaw being movable between an electrode clamping position and a release position,
3. a rigid conducting element 16 having a lower power cable attachment portion 17 attachable directly or indirectly to power cable 18, an upper portion 19 electrically engageable with the moving jaw, and a track portion 20, the rigid conducting element able to move between a power on position where the upper portion electrically engages with the moving jaw to provide power to the electrode and a power off position where the upper portion is in an electrically isolating position relative to the moving jaw,
4. the moving jaw being locked into the electrode clamping position such that the moving jaw is unable to move to the release position while the rigid conducting element is electrically engaged with the moving jaw,
5. an operating member [e.g. switch] 21 having a handle portion 22 extending from the housing and able to be operated by a person, the operating member having a travelling portion, in the form of a small wheel 23 that travels along the track portion 20 on the rigid conducting element, the travelling portion adapted to travel along the track portion from a first position where the travelling portion pushes the rigid conducting element into the electrically engaged position thereby providing power to the electrode, and to a second position where the rigid conducting element can move to the electrically isolating position relative to the moving jaw,
6. a biasing member [e.g. spring] 24 to bias the rigid conducting element into the electrically isolating position such that when the travelling portion moves to the second position, the biasing member biases the rigid conducting element into the electrically isolating position, and
7. a jaw release member [e.g. trigger] 25 which is operable from outside the housing to enable the jaws to be released such that the electrode can be removed or inserted between the jaws.

The basic operation of the electrode handle is that the power cable 18 is electrically connected to the rigid conducting element 16. The rigid conducting element 16 can be pushed into electrical engagement with the electrically conductive moving jaw 14 and the moving jaw 14 clamps against an electrode (not illustrated) thereby providing power to the electrode. The rigid conducting element is pushed into electrical engagement (e.g. the on position) when the handle 22 is in the closed position illustrated in FIG. 2. When the handle is pulled into the open position illustrated in FIG. 3, the rigid conducting element 16 is no longer pushed into electrical engagement with the moving jaw. The spring 24 functions to push the rigid conducting element 16 away from the moving jaw (the position illustrated in FIG. 3) and therefore into the "off" position. The trigger 25 can now be squeezed which will open the moving jaw to allow attachment/removal of the electrode. When the operating member 21 is in the closed position (FIG. 2), it clamps the rigid conducting element against the moving jaw. The trigger 25 has a projection 26 (best illustrated in FIG. 2) which is slightly spaced away from the rigid conducting element 16 but any attempted squeezing of trigger 25 will soon cause projection 26 to abut against the rigid conducting element and as the rigid conducting element is clamped in position (by the operating member 21), the trigger 25 cannot be fully squeezed to open the moving jaw 14. Thus, as long as the operating member 21 is in the closed position illustrated in FIG. 2, no amount of squeezing of trigger 25 will cause the moving jaw 14 to open.

Figure 3:
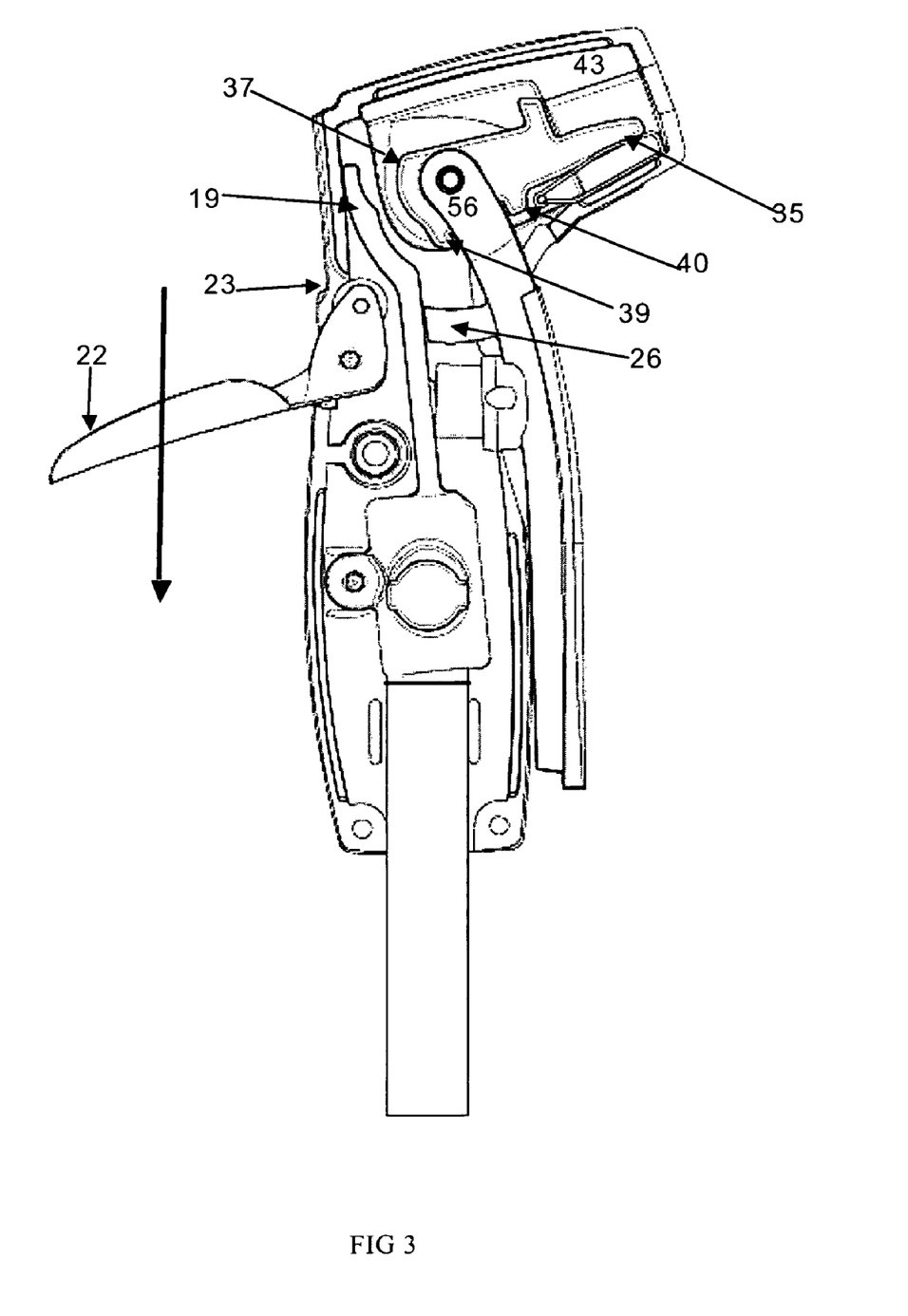
FIG. 3 illustrates the electrode holder in the "off" position where the electrode (not illustrated) can be removed.
Figure 4:
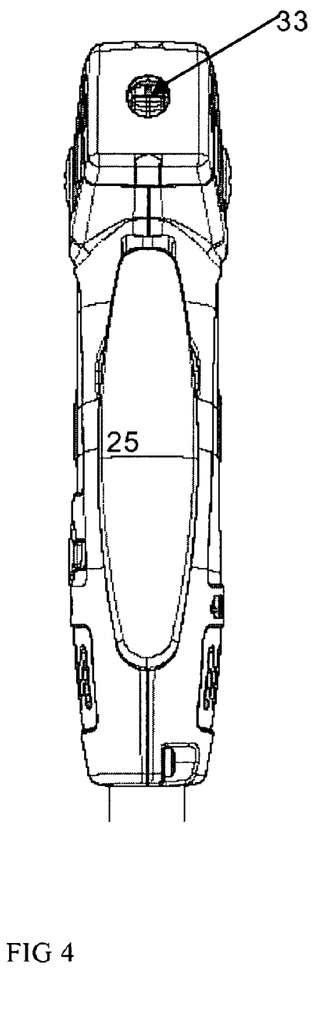
FIG. 4 illustrates a "front" external view of the electrode holder in the "on" position.
Figure 5:
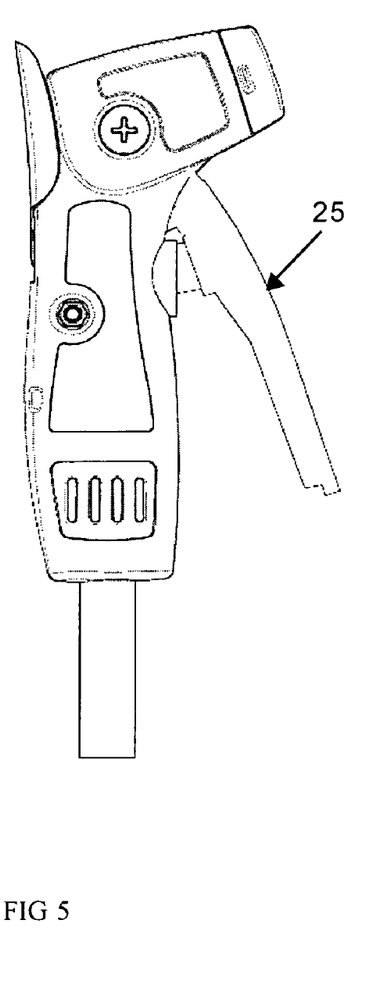
FIG. 5 illustrates a "side" external view of the electrode holder in the "on" position.
Figure 6:
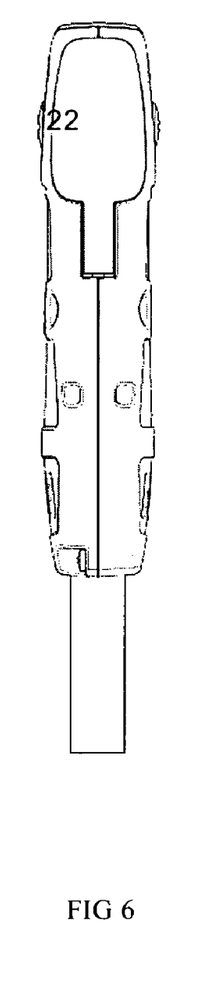
FIG. 6 illustrates a "rear" external view of the electrode holder in the "on" position.

To release (open) the moving jaw 14, it is first necessary to operate the handle 22 of the operating member by grasping the handle and pulling the handle downwardly to the position illustrated in FIG. 3. As this happens, the rigid conducting element is released from its tight clamping engagement against the rear of the moving jaw 14 and spring 24 will immediately push the rigid conducting element away from moving jaw 14 (e.g. into the "off" position). The trigger 25 can now be fully squeezed and in doing so can pivot moving jaw 14 into the open position which is illustrated in FIG. 3. An electrode (not illustrated) can now be inserted or removed.

The various components will now be described in greater detail.

The electrode holder in the particular embodiment comprises a left-hand and a right-hand outer housing 10, 11. Each housing is made from strong durable plastic material. The housing has a head portion 12 and a handle portion 13 and together the shape of the housing is somewhat L-shaped. The handle portion has a length of about 13 cm, a width of about 4 or 5 cm and a "thickness" of about 3 or 4 cm (when the housings are attached to each other). The head portion has a length of about 8 cm, and a width of about 5 cm and a "thickness" of about 3 or 4 cm.

Each housing 10, 11 is provided with a relatively large opening 27 extending through the head portion and another small opening 28 extending through the handle portion. One of the housings (e.g. 10 in the particular embodiment) contains a third opening 29 which is closed with a removable cover and 30 and which provides access to a grub screw 31 which will be described in greater detail below. Finally, when the two housings are attached to each other, there will be a bottom opening 32 through which the power cable 18 can pass, and an opening 33 in the front of the head portion to enable an electrode to be inserted into the head portion.

Inside the head portion 12 is an electrode clamping assembly and the clamping assembly comprises the moving jaw 14 and a non moving jaw (or fixed jaw) 15. The moving jaw 14 as illustrated in FIG. 1, is a piece of solid brass and has a particular configuration. The front of the moving jaw is somewhat L-shaped and is defined by a nose portion 34 (see figure). The upper portion of nose portion 34 comprises a land portion which comprises one of the clamping faces 35 of the jaw (that is the clamping face which clamps directly against an electrode). The rear of the nose portion contains an upright stop portion 36 against which the rear of the electrode rests to prevent over insertion of the electrode. The rear part 37 of the moving jaw 14 is curved this being perhaps best illustrated in FIG. 3. The moving jaw is provided with an opening 38 extending entirely through the moving jaw. Finally, the bottom of the moving jaw comprises a pair of spaced apart limiters 39, 40 which are again best illustrated in FIG. 3. The function of these limiters is to engage with the upper part of trigger 25 and which will be described in greater detail below.

The fixed jaw 15 is a larger structure which is again made from solid brass. The fixed jaw is substantially hollow and contains a through opening 41 which, when assembled aligns with opening 38 in the moving jaw such that a single connecting pin can be used (this will be described below). The rear of fixed jaw 15 has a substantially inverted U-shaped configuration and is open such that the rear curved part 37 of the moving jaw 14 can be accessed by the rigid conducting element which will be described in greater detail below. The moving jaw 14 sits within the substantially hollow fixed jaw 15. The front of the fixed jaw 15 contains a substantially inverted U-shaped channel 42 which defines the opening into which the electrode is positioned. The upper wall 43 (see FIG. 2 at least) of the U-shaped channel comprises the other clamping face of the clamping assembly. Thus, the two clamping faces (or clamping jaws) of the clamping assembly comprise the upper wall 43 on the fixed jaw and the clamping face 35 (see FIG. 2 at least) on the nose portion of the moving jaw 14. The electrode will then be clamped between these two clamping faces/clamping jaws.

The larger fixed jaw 15 and the smaller moving jaw 14 (which sits inside the fixed jaw 15) are supported by a pin 44 which is illustrated in FIG. 1. Pin 44 is threaded at each end. Pin 44 passes through each opening 27 in the head portion 12 of the outer housings, through the opening 38 in moving jaw 14 and through the opening 41 in the larger fixed jaw 15. Threaded end caps 45 are then threaded onto each end of the pin 44 to hold all the components in place and also to assist in clamping the two outer housing portions 10, 11 to each other. The pin 44 also attaches the upper end of trigger 25 relative to the moving jaw 14 and this will be described in greater detail below.

Inside the housing is a rigid conducting element 16. The rigid conducting element 16 is made of solid brass and is of a unitary structure and comprises a lower power cable attachment portion 17 and an upper finger like relatively flat portion which comprises a track portion 20 having a length of about 50 mm, and an uppermost portion 19 which engages with the rear curved part 37 of moving jaw 14 when the electrode holder is in the "power on" position. The power cable attachment portion 17 comprises a relatively thick hollow cylindrical body 48 (see at least FIG. 2) which has an open bottom to enable the power cable 18 to be inserted through the open bottom. It is sometimes desirable to have a capping member 46 (made of thin conductive metal) extending over the exposed wires 47 of power cable 18 to prevent stray wires from passing along the outside of the attachment portion 17. Once the power cable has been inserted through the open bottom, it is locked in place by a small grub screw 31. The small grub screw 31 has a hexagonal socket arrangement (see FIG. 2) such that a small hexagonal allen key can be inserted in the socket to tighten or loosen the grub screw. The grub screw can be accessed through opening 29 in housing 10 (see FIG. 1) but this opening is usually closed by cap 30.

The rigid conducting element 16 is pivotally mounted in the housing. To do so, a small lug 49 (see FIG. 2) extends from the side wall of body 48 and contains an opening through which a small pivot pin 50 can pass to pivotally connect the entire rigid conducting element 16 to the housing. The rigid conducting element 16 can therefore pivot about the pivot pin between the "power off" position and the "power on" position. This will be described in greater detail below.

The rigid conducting element 16 can be pushed hard and clamped hard against the rear part 37 of moving jaw 14 by the operating member 21. Operating member 21 is somewhat L-shaped in configuration and comprises a longer external handle 22 (see FIG. 2 and FIG. 3), and a shorter leg portion which terminates in rotating wheel 23. An opening is provided in the corner of the generally L-shaped operating member through which a pivot pin 51 is fixed such that the operating member 21 can pivot between the closed position illustrated in FIG. 2 (which is the power on position) and the open position illustrated in FIG. 3 (which is the power off position). The member may function as a cam member.

The wheel 23 forms the "travelling portion" and the wheel rolls along the track portion 20 on the rigid conducting element 16. This movement occurs when the handle 22 is pulled downwardly from the position illustrated in FIG. 2 to the position illustrated in FIG. 3. Thus, as the handle is pulled downwardly, wheel 23 travels "upwardly" from the lower portion of the track portion (see FIG. 2) to the upper portion of the track portion (see FIG. 3). When the wheel is in the lower portion (FIG. 2—the handle being closed), the wheel 23 pushes hard against the track portion 20 and this, in turn, pushes the upper portion 19 of the rigid connecting element 16 hard up against the curved rear part 37 of the moving jaw 14. This is the "power on" position and power can now flow from the power cable 18 along the rigid conducting element 16, and through moving jaw 14 and fixed jaw 15 and along the electrode. When the wheel is in the upper portion (FIG. 3—handle has been pulled downwardly), the wheel now disengages from the track portion and this enables the entire rigid conducting element 16 to pivot rearwardly (see FIG. 3) such that it no longer contacts the moving jaw. This is the "power off" position.

The rigid conducting element 16 is biased (pushed) naturally towards the "power off" position by the spring 24. One end of spring 24 is positioned on a small abutment 52 on the rigid conducting element 16. The other end of spring 24 pushes against the inside face of trigger 25. The inside face of trigger 25 contains a small collar 53 (see FIG. 2) in which the other end of spring 24 can be positioned. A small plastic cap 54 (see FIG. 1) is positioned on one end of the spring and sits within the collar 53.

Figure 2:
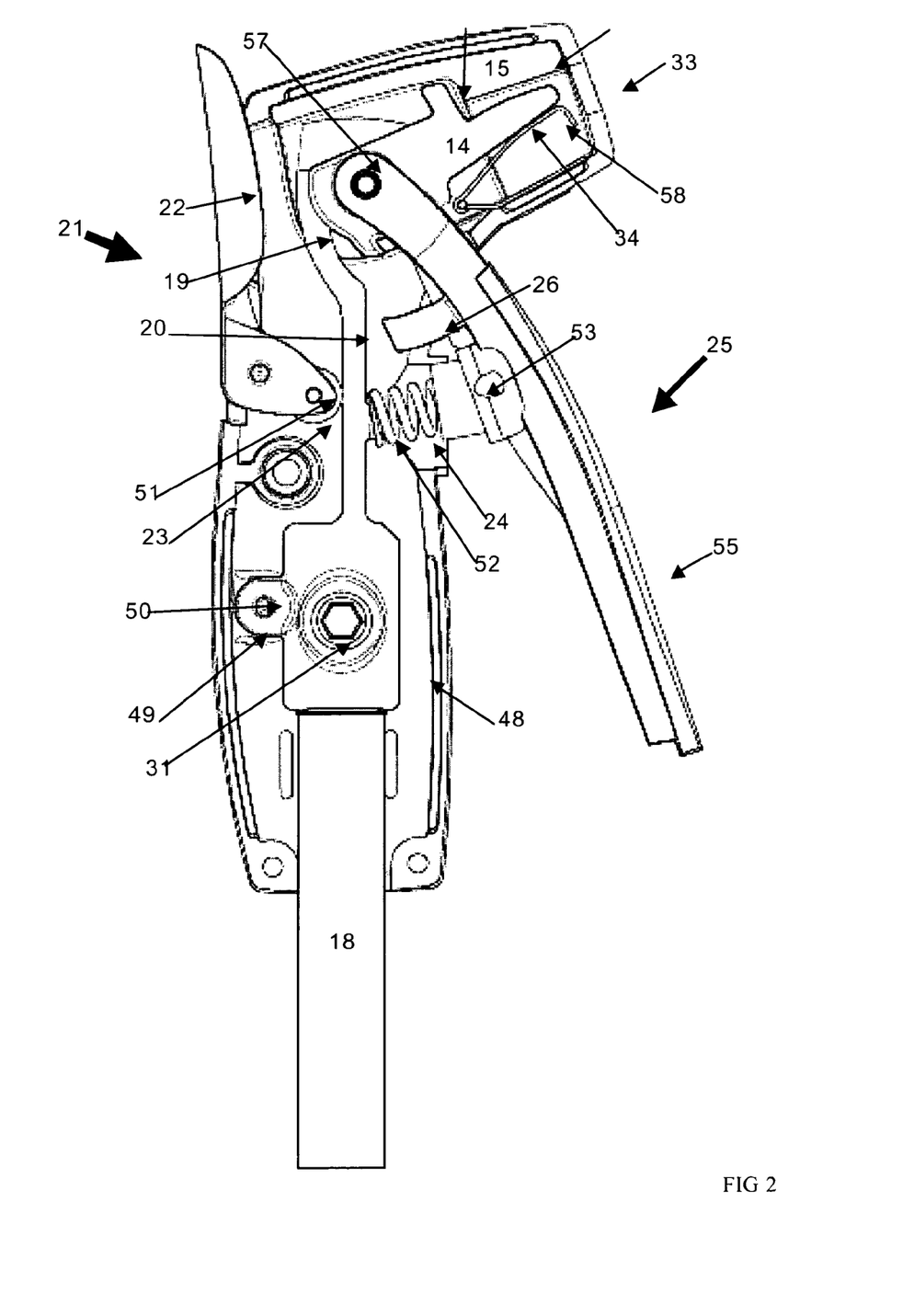
FIG. 2 illustrates a section view of the electrode holder in the "on" position.

The trigger 25 comprises a relatively long plastic lever having a lower gripping portion 55 and an upper head portion which is bifurcated into two spaced apart brackets 56, each bracket having an aligned opening 57. The brackets 56 sit on each side of the moving jaw 14 and the opening 57 in each bracket aligns with the opening 38 in the moving jaw 14. Therefore, insertion of pin 44 also causes the pin to pass through opening 57 in each bracket 56 which pivotally pins the trigger relative to the moving jaw 14. To enable rotation (squeezing) of the trigger to also rotate the moving jaw 14, the moving jaw is provided with the pair of spaced apart limiters 40. These are best illustrated in FIG. 2 and extend to each side of the upper head portion of trigger 25. Therefore, squeezing of the trigger will cause the upper head portion to contact one of the limiters and therefore cause rotation of the moving jaw 14 from the closed position illustrated in FIG. 2 to the open position illustrated in FIG. 3. Conversely, release of the trigger will cause spring 24 to shoot the trigger 25 back into the position illustrated in FIG. 2 and the other limiter on the moving jaw will engage with the other side of the upper head portion to push the moving jaw to the closed (clamping) position illustrated in FIG. 2. A small ancillary leaf spring 58 (see FIG. 1 and FIG. 2) is provided to assist in the closing of moving jaw 14 as there is some "lost motion" between the trigger 25 and the moving jaw.

The inside face of trigger 25 contains the projection 26. Projection 26 is configured to abut against the other side of the track portion 20 of the rigid conducting element 16. Thus, when the electrode holder is in the "power on" position illustrated in FIG. 2, the operating member 21 is in the closed position causing wheel 23 to push hard against the track portion 20 which, in turn, tightly clamps the upper portion 19 of the rigid conducting element against the rear of the moving jaw. Squeezing of trigger 25 will allow the trigger to move only by a few millimetres until such time as the end of projection 26 contacts the other side of track portion 20. Further squeezing of the trigger is not possible and therefore moving jaw 14 stays in the clamped position.

To enable the electrode to be removed, the handle 22 of the operating member 21 is pulled downwardly. When this happens, wheel 23 is released from the track portion and the spring 24 immediately pushes the upper portion 19 away from the rear end of moving jaw 14 to the power off position. This happens even before trigger 25 is squeezed. Therefore, before the trigger is even squeezed, the power is in the "off" position. The trigger can now be squeezed against the bias of spring 24 and far enough to cause moving jaw 14 to rotate clockwise (downwardly) to the position illustrated in FIG. 3. An electrode can now be inserted or removed without fear of an electric hazard.

Once the new electrode has been inserted, trigger 25 can be released and it will spring back (because of spring 24) to the position illustrated in FIG. 2 which will automatically cause moving jaw 14 to move back to the clamping position. At this stage, the power is still off and it is possible to squeeze the trigger 25 to again open the jaw. However, at all stages will the power be in the "off" position. To turn on the power, the handle 22 is pushed back upwardly from the position illustrated in FIG. 3 to the position illustrated in FIG. 2. As this occurs, wheel 23 travels down track portion 20 and, at the position illustrated in FIG. 2, there is a slight "over centre" arrangement and the rigid conducting element 16 is now clamped hard against the moving jaw 14. Because of the over centre arrangement, no amount of squeezing of trigger 25 can result in the moving jaw 14 moving into the open position while the power is still on.

A small plastic cover member 60 may be fitted over the front of head portion 12 and contains an opening through which the electrode can pass, the cover member functioning as a heat shield.

Alternative Embodiments of the Invention

FIGS. 7-16

Figure 7:
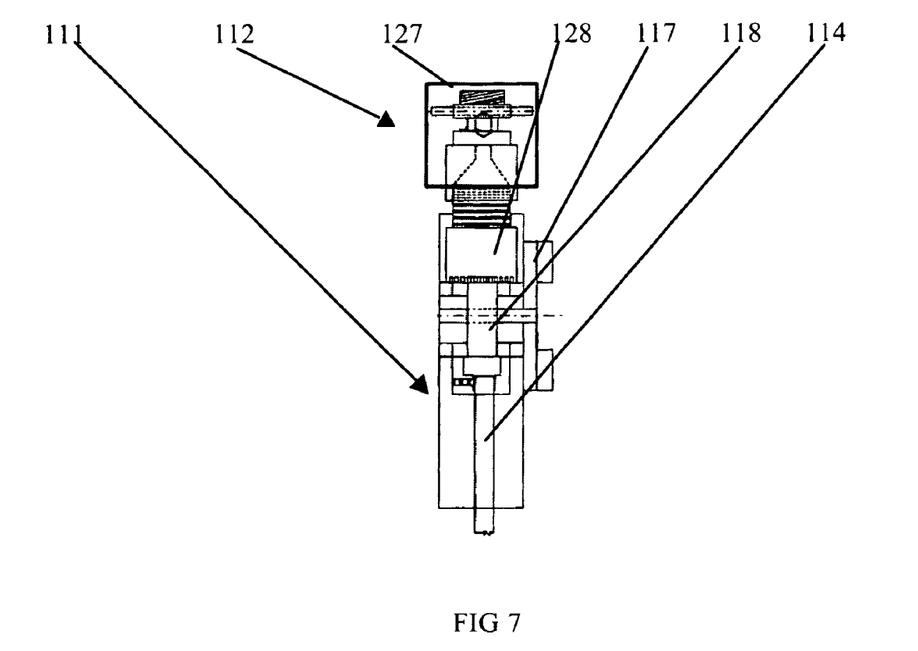
FIG. 7 illustrates a top view of a different type of electrode holder having an isolation switch in the power use position.
Figure 10:
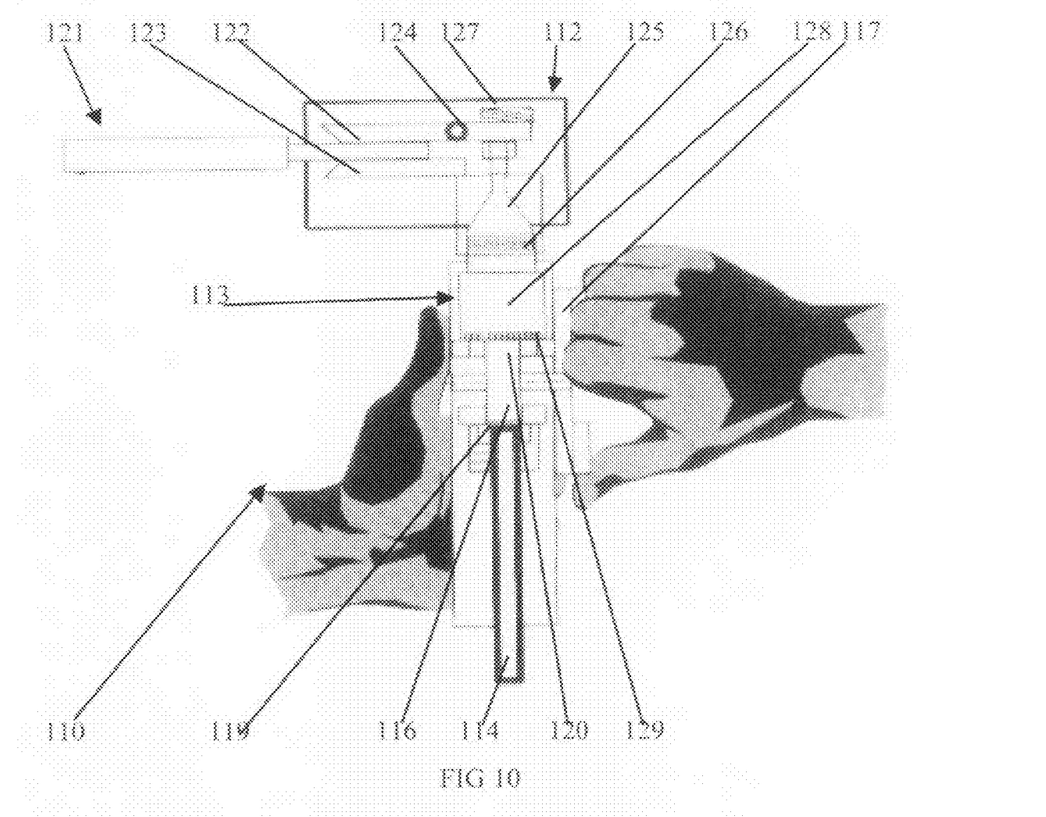
FIG. 10 illustrates the electrode holder of FIGS. 7-9 in the power use position and about to be switched to the power isolating position.
Figure 11:
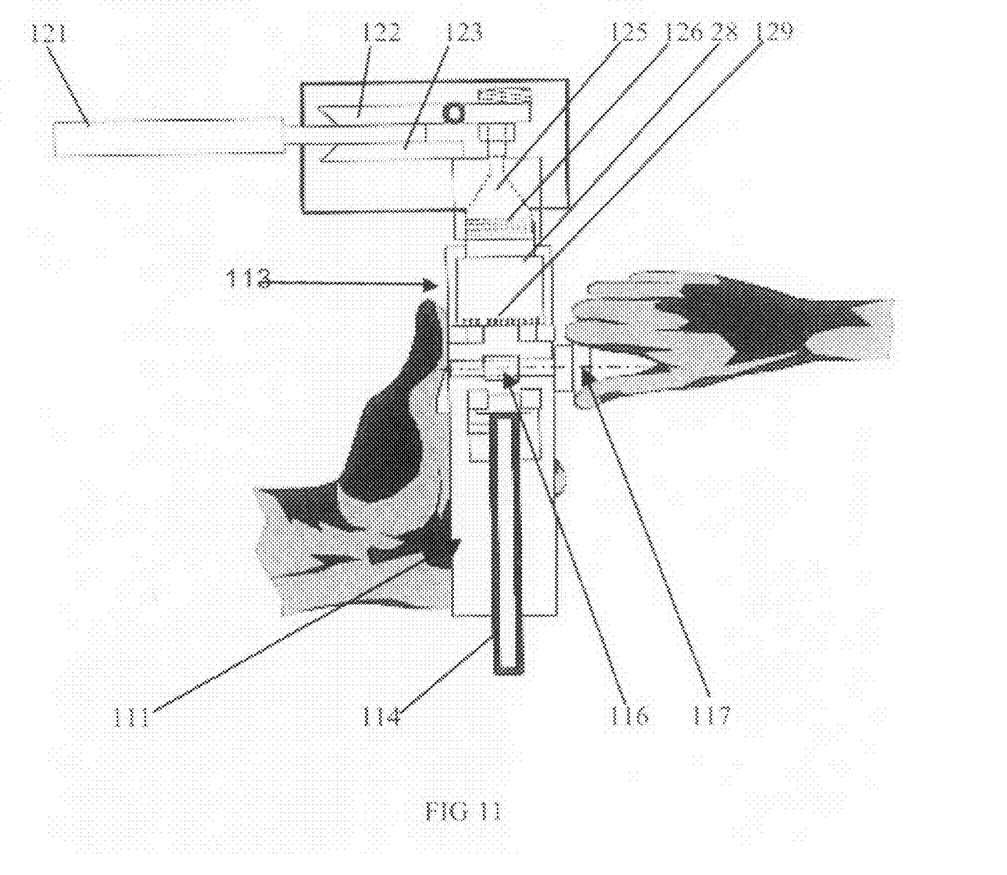
FIG. 11 illustrates the electrode holder of FIG. 10 having been switched to the power isolating position.

Referring now to FIGS. 10 and 11, there is illustrated an electrode holder 110 which comprises a handle portion 111 and a head portion 112. Handle portion 111 has an outer body or casing 113 which can be gripped by an operator. An electric cable 114 extends through handle portion 111 and is connected by a cable connection screw 115 (see FIG. 7). Of course, other types of attachment of the cable to the electrode holder can be used.

An isolating switch 116 is attached to handle portion 111. The isolating switch 116 comprises an external switch 117 which can be turned as illustrated in FIGS. 10 and 11. The isolating switch 116 further comprises an electric connecting member 118 having two ends 119, 120. When connecting member 118 is in the "on" position illustrated in FIG. 10, electricity can flow from cable 114 through connecting member 118 and towards the electrode 121. However, when connecting member 118 has been rotated to the "off" position illustrated in FIG. 11, the connecting member does not connect either cable 114 or ultimately electrode 121.

Electrode 121 is held in place between a pair of jaws 122, 123. The arrangement as illustrated in the figures is for a manual metal arc electrode holder and therefore it is not to be seen as limiting to the invention but illustrative only of the invention. In this particular embodiment, jaw 123 is a fixed jaw while jaw 122 can pivot via a jaw pivot 124 between a clamping position illustrated in the figures and where electrode 121 is clamped in place, and a free position where jaw 122 pivots upwardly about pin 124 to allow electrode 121 to be removed. The jaw 122 can move between the free position (pivot upward position not illustrated) and the clamping position illustrated in the figures as follows: a first member 125 (also known as a tension pin), has a lower end which is threaded 126. An upper end of first member 125 is attached to the rear of jaw 122. A pivot spring 127 tensions first member 125. Collar 128 has an internal thread (not illustrated) which mates with the thread on the lower end of first member 125. The collar 128 can be manually rotated to extend first member 125 out of the collar or to retract first member 125 into the collar depending on the direction of rotation of collar 128. Thus, rotation of collar in one direction will retract first member 125 into collar 128 and in doing so will cause jaw 122 to pivot about pin 124 to a free position where electrode 121 can be removed. A new electrode can then be inserted and collar 128 is rotated in the opposite direction to cause jaw 122 to move back to the clamping position (illustrated in the figures) to clamp electrode 121 in place. Of course, other types of locking arrangements are envisaged.

The electric connecting member 118 on the isolating switch 116 functions to lock collar 128 against rotation when the isolating switch is in the "on" position. This position is illustrated in FIG. 10 and also in FIG. 7. Connecting member 118 is provided with an array of teeth on end 120 which mesh into corresponding teeth 129 on the lower peripheral edge of collar 128. When in this position, collar 128 is locked against rotation.

When the electric connecting member 118 is rotated to the "off" position illustrated in FIG. 11, the teeth on the electric connecting member do not engage with teeth 129 on collar 128 which means that collar 128 can be rotated to release electrode 121 from between jaws 122, 123.

Figure 12:
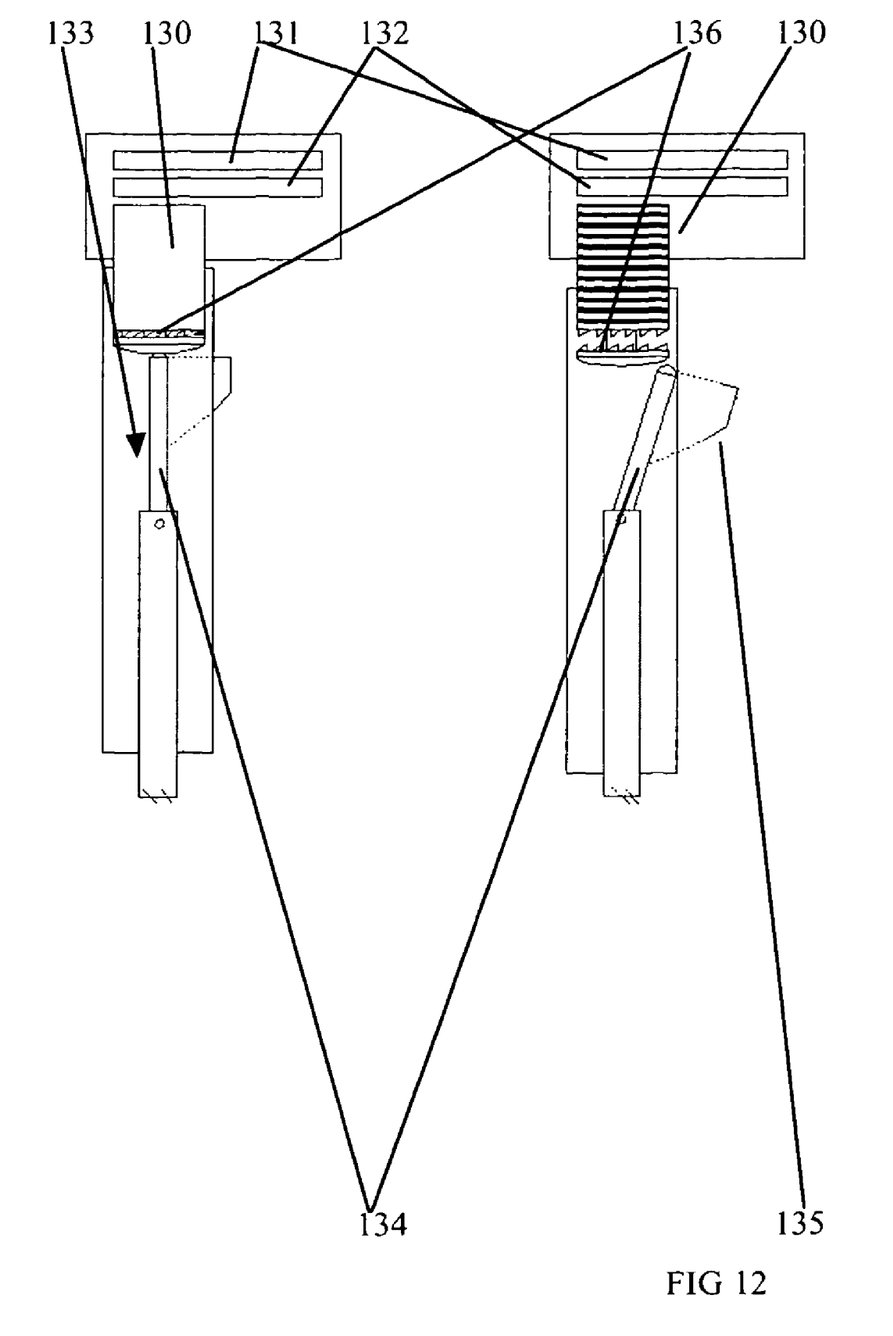
FIG. 12 illustrates a toggle type isolating switch according to another embodiment of the invention.

FIG. 12 illustrates another embodiment of the invention which is similar to that described above in that a locking collar 130 is provided which rotates to clamp or unclamp jaws 131, 132. An isolating switch 133 comprises an electrically conductive member 134 and an external finger or thumb operated trigger 135. Below collar 130 is provided a locking arrangement which comprises a locking disc 136. The locking disc 136 does not rotate can be spring biased against electrically conductive member 134. The locking disc 136 is provided with locking teeth which engage with locking teeth on the bottom of collar 130, this being illustrated in FIG. 12. The arrangement is that when trigger 135 is depressed, it moves conductive member 134 from the "on position" to the "off position". In the "off position" conductive member 134 does not push against the bottom of locking disc 136 and therefore locking disc 136 moves out of engagement with the bottom of collar 130 by virtue of locking disc being spring biased (it is envisaged that locking disc need not be spring biased and may drop-down into the out of engagement position by gravity). When locking disc 136 does not engage with the bottom of collar 130, collar 130 can be rotated to release an electrode from between jaws 131, 132. However, when the conductive member 134 is in the "on" position, locking disc 136 engages with collar 130 to prevent collar 130 from releasing an electrode between the jaws 131, 132.

Figure 13:
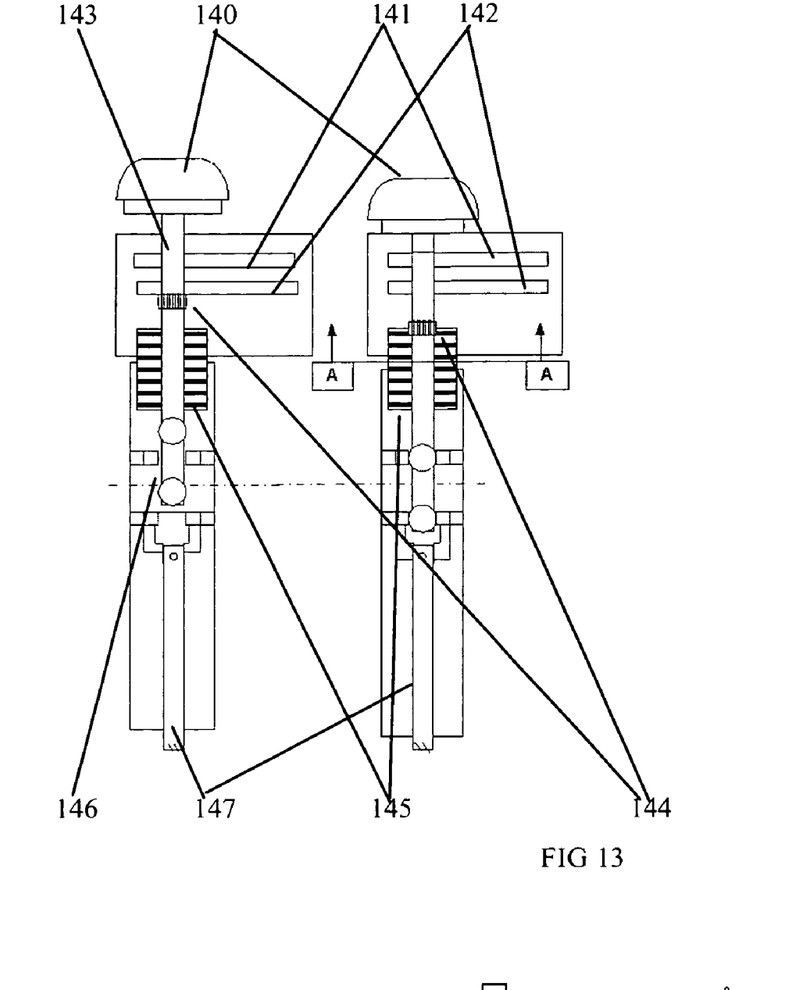
FIG. 13 illustrates a push button type isolating switch according to another embodiment of the invention.
Figure 14:
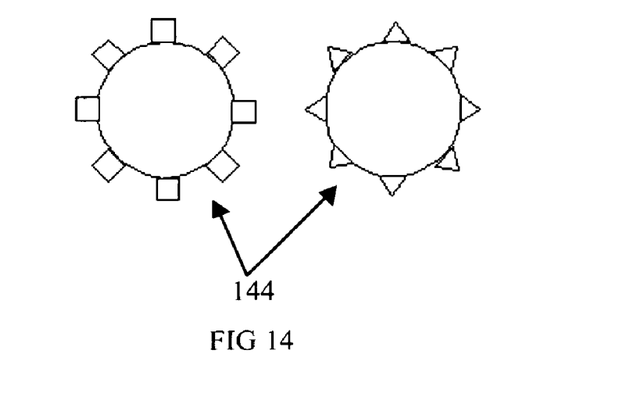
FIG. 14 illustrates typical shapes of locking splines used on the embodiment of FIG. 13.

FIG. 13 and FIG. 14 illustrate another embodiment of the invention which basically uses a button 140. Button 140 can be pushed down to allow an electric current to flow to jaws 141, 142. Specifically, button 140 has an internal shaft 143 fitted with a peripheral spline 144. The spline 144 can move into engagement with collar 145 to prevent the collar from being rotated to release an electrode from between jaws 141, 142. When the button is depressed, spline 144 engages with collar 145 and when the button is pushed upwardly, spline 144 is released from engagement with collar 145 and an electrode can be removed or inserted between jaws 141 and 142. As well, an isolating switch 146 is provided which electrically engages with cable 147 when button 140 is depressed (power on position) and which disengages with cable 147 when the button is pulled upwardly (power off position). FIG. 14 illustrates two types of splines 144 but it should be appreciated that the invention is not to be limited to these configuration of splines.

Figure 15:
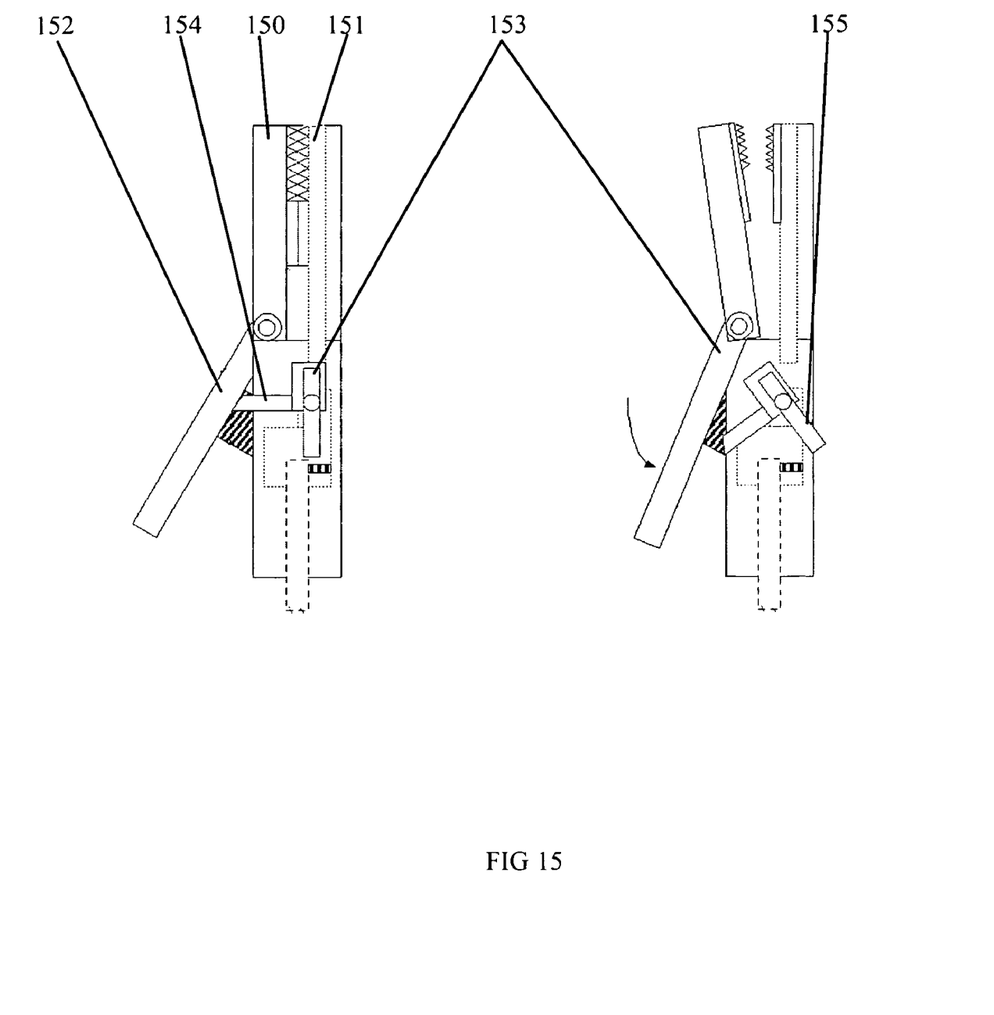
FIG. 15 illustrates an isolating switch according to another embodiment of the invention.

FIG. 15 illustrates another embodiment of the invention. In this embodiment, jaws 150, 151 are operated by a spring-loaded handle 152. An isolating switch is provided which includes an electrically conductive member 153 and an external trigger 155. The isolating switch contains a locking bar 154 which locks against the underneath of handle 152 to prevent handle 152 from being squeezed to open jaws 150, 151. However, the isolating switch can be rotated (by rotating trigger 155) which causes electrically conductive member 153 to disengage with jaw 151 (thereby adopting the off position) and also causes locking bar 154 to move away from handle 152 thereby allowing handle 152 to be squeezed to open jaws 150, 151. Thus, an electrode can only be inserted between jaws 150, 151 when the power is in the off position.

The isolating switch can be made a relatively lightweight material to add minimal additional weight to the electrode holder so as to not create discomfort to the operator. The isolating switch can be positioned on any part of the electrode holder or even on the power cable which connects the electrode holder so as to not create discomfort to the operator.

Figure 16:
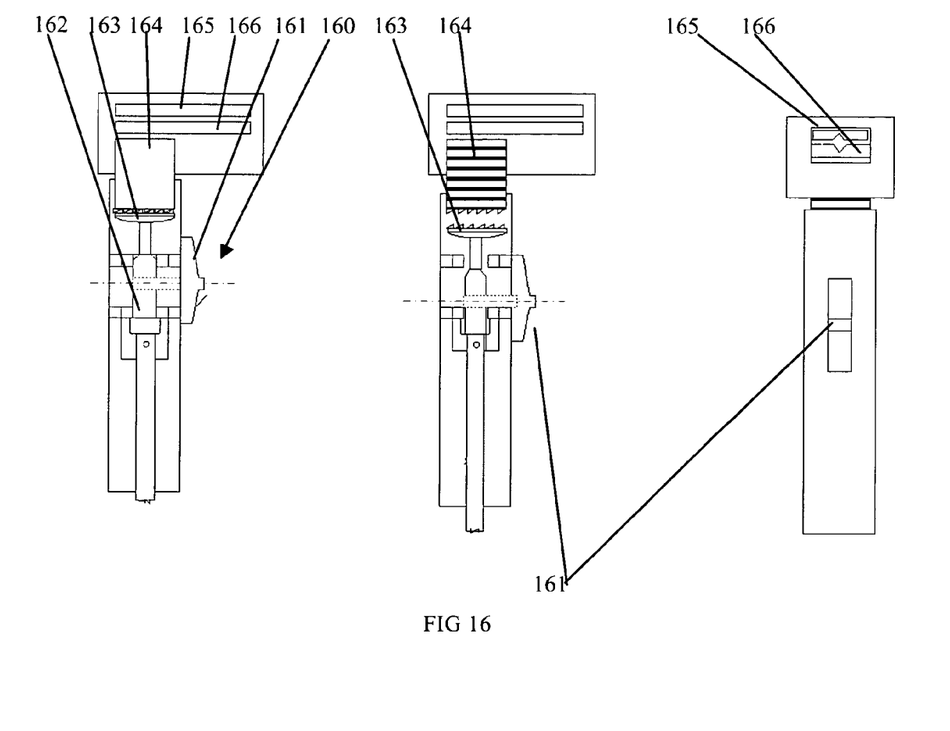
FIG. 16 illustrates another embodiment of a handle having an isolating and locking switch.

Referring to FIG. 16 there is illustrated another embodiment. In this embodiment, isolating switch 160 comprises a sliding button 161 which can slide between a power on position (up position) and a power off position (down position). Button 161 is connected to an electrically conductive member 162. The top of member 162 is provided with a plate 163 containing teeth, this being similar to that described with reference to FIG. 12. Plate 163 engages with teeth on the bottom of collar 164. The collar 164 rotates to lock and unlock jaws 165, 166. When button 161 has been slid into the on position, plate 163 engages with the bottom of collar 164 to prevent the collar from being rotated and thus preventing an electrode from being removed from between jaws 165, 166. Also, this action causes power to flow to jaws 165, 166. Conversely, when button 161 has been slid down into the off position, plate 163 no longer engages with collar 164 and this action also isolates power from jaws 165, 166.

Throughout the specification and the claims, unless the context requires otherwise, the term "comprise", or variations such as "comprises" or "comprising", will be understood to apply the inclusion of the stated integer or group of integers but not the exclusion of any other integer or group of integers.

Throughout the specification and claims, unless the context requires otherwise, the term "substantially" or "about" will be understood to not be limited to the value for the range qualified by the terms.

Any embodiment of the invention is meant to be illustrative only and is not meant to be limiting to the invention. It should be appreciated that various other changes and modifications can be made to any embodiment described without departing from the spirit and scope of the invention. Consequently, the appended claims should be broadly construed in a manner consistent with the novel aspects of the invention, and should not be limited to their literal terms.

What is claimed is:

1. An electrode holder comprising:
 a) an outer housing having a head portion and a handle portion,
 b) an electrode clamping assembly in the head portion and which comprises a moving jaw and a fixed jaw, the moving jaw being movable between an electrode clamping position and a release position,
 c) a rigid conducting element having a lower power cable attachment portion attachable directly or indirectly to power cable, an upper portion electrically engageable with the moving jaw, and a track portion, the rigid conducting element able to move between a power on position where the upper portion electrically engages with the moving jaw to provide power to the electrode and a power off position where the upper portion is in an electrically isolating position relative to the moving jaw,
 d) the moving jaw being locked into the electrode clamping position such that the moving jaw is unable to move to the release position while the rigid conducting element is electrically engaged with the moving jaw,
 e) an operating member having a portion extending from the housing and able to be operated by a person, the operating member having a travelling portion that travels along the track portion on the rigid conducting element, the travelling portion adapted to travel along the track portion from a first position where the travelling portion pushes and locks the rigid conducting element into the electrically engaged position thereby providing power to the electrode, and to a second position where the rigid conducting element can move to the electrically isolating position relative to the moving jaw,
 f) a biasing member to bias the rigid conducting element into the electrically isolating position such that when the travelling portion moves to the second position, the biasing member biases the rigid conducting element into the electrically isolating position, and
 g) a jaw release member which is operable from outside the housing to enable the jaws to be released such that the electrode can be removed or inserted between the jaws.

2. The electrode holder of claim 1 wherein the travelling portion on the operating member comprises a rotating wheel.

3. The electrode holder of claim 2, wherein the biasing member comprises a spring one end of the spring pushing against the rigid conducting element to push the rigid conducting element into the electrically isolating position, the other end of the spring pushing against the jaw release member.

4. The electrode holder of claim 3, wherein the jaw release member is attached to the moving jaw, and the spring pushes against the jaw release member which pushes the moving jaw to the clamping position.

5. The electrode holder of claim 4, wherein the moving jaw is moved to the release position by squeezing the jaw release member against the bias of the spring.

6. The electrode holder of claim 5, wherein the jaw release member contains a projection which abuts against the rigid conducting element when the rigid conducting element is in the locked and electrically engaged position thereby preventing operation of the jaw release member and thereby preventing movement of the moving jaw to the release position, when the electrode holder is in the power on position.

7. The electrode holder of claim 6, wherein movement of the travelling portion to the second position causes the rigid conducting element to be pushed to the electrically isolating position by the spring, and allows the jaw release member to be squeezed to move the moving jaw to the release position.

* * * * *